8983X
J. L. Mott,
Heating Stove.
Patented July 21. 1835.
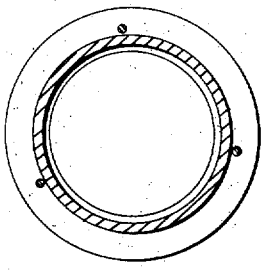
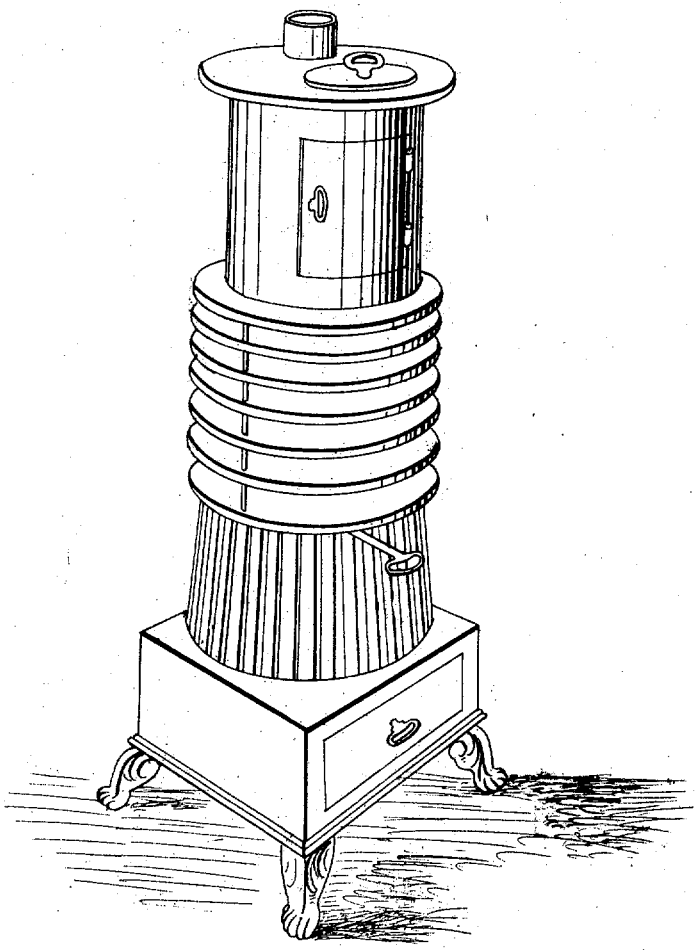

[illegible] Extended for 7 years from 21 July 1849. 87.

July 21. 1835. 8983X

Jordan L. Mott, of the City of New York
Letters Patent

The schedule referred to in these Letters Patent and making part of the same, containing a description in the words of the said Jordan L. Mott himself of his improvement in the construction of stoves for the burning of anthracite and other fuel.

---

To all whom it may concern: Be it known that I, Jordan L. Mott of the City of New York in the State of New York have invented an improvement in the construction of stoves, for the burning of anthracite and other fuel, which improvement is also applicable to Retorts for Gas Works, and other instruments for the generating or applying of heat; and I do hereby declare that the following is a full and exact description thereof. For the purpose of description I will suppose a vertical cylindrical stove to be constructed, observing however that I do not intend thereby to limit myself as respects the form, position, or application of the apparatus, but only to give an exemplification of a practical mode of carrying the principle of construction into effect.

The body or furnace part, of this stove is to be of cast iron, and consist of any required ~~of any [illegible]~~ number of separate rings, of such internal diameter as may be required for the furnace, these rings are to be placed or superimposed, upon each other to the required height, rims or ledges, and corresponding grooves, or hollows, being cast upon their touching sides to keep them in their places, holes are also to be cast in them, or ears formed on them to receive rods by which they may be confined together.

The lower part of the stove forming the ash pit, and its appendages, and also that part which is above the fire may be constructed in any of the usual forms, or of any of the ordinary materials the improvement made by me, consisting entirely in the construction of that part which is formed of rings, in the way described. —

I intend usually to form these rings so that when put together the interior of the furnace shall by their junction have a uniform continuous surface, either cylindrical, conical, or otherwise, whilst the outside shall be fluted, ribbed, or grooved, so as to expose a larger surface to the action of the external air, as this mode of forming them, will tend to prevent their being over heated, by its extended radiation; when used for gas retorts, their outsides will form one continuous surface, as best calculated to receive the action of the fire, by which they are to be heated, when used in tubes for the conveyance,

8983X distribution or management of heat, they must of course be so formed, as to adapt them to the particular purpose to which they are to be applied —

~What I claim as my invention, and desire to secure by Letters Patent is the forming of the exterior, or shell of furnaces or fire places, for stoves of various kinds, the bodies of gas retorts, and other apparatus which are to be exposed to great alterations of temperature, by the combination of separate rings rims or frames of metal usually of cast iron, by which means any difference of expansion in the respective parts may take place without the danger of breaking, whilst any portion which is defective may be easily removed, and its place supplied —

Exd. Witnesses — Jordan L. Mott

W.G.C. John Dewson Jr. }
Thomas H. Mills }

(July 21. 1835) [585 w.t.]

(Drawing)